Jan. 14, 1964  D. H. IMHOFF ET AL  3,117,912
METHOD OF PRODUCING NEUTRONS
Filed June 17, 1954  3 Sheets-Sheet 1

INVENTORS
Donald H. Imhoff
Wesley H. Harker
ATTORNEYS

INVENTORS
Donald H. Imhoff
Wesley H. Harker
By
ATTORNEYS

INVENTORS
Donald H. Imhoff
Wesley H. Harker
By
ATTORNEYS

United States Patent Office 3,117,912
Patented Jan. 14, 1964

3,117,912
METHOD OF PRODUCING NEUTRONS
Donald H. Imhoff, Walnut Creek, and Wesley H. Harker, Livermore, Calif., assignors, by mesne assignments, to the United States of America as represented by the United States Atomic Energy Commission
Filed June 17, 1954, Ser. No. 437,328
23 Claims. (Cl. 176—5)

This invention relates to the production of heat and power from nuclear forces and particularly relates to the creation of an intense flux of fast or high-energy neutrons from a nuclear fusion or thermonuclear reaction, which is instituted and confined by a periodically time-varying, oscillating, or pulsating magnetic flux, after which the released neutrons may act to produce heat from source-fissionable materials, exemplified by uranium 238 and thorium 232, as contrasted with thermally fissionable materials such as uranium 235 and plutonium 239, that are fissioned by slow or thermal neutrons.

In our copending applications, Serial No. 422,846, filed April 13, 1954, entitled "Method of Producing Neutrons," and Serial No. 426,353, filed April 29, 1954, entitled "Heat Generation," there is disclosed and claimed a system for confining a thermonuclear reaction of the hydrogen isotope type which is characterized by the use of complementary steady magnetic fields and oscillating or time-varying electric fields. The present invention is distinguished therefrom by the use of a periodic or time-varying magnetic field which is either a combination of a steady field on which is superimposed an oscillating magnetic field, or, for a special case, a purely oscillating or pulsed magnetic field. Either of these, as will be explained below in more detail, act upon injected particles of deuterons and tritons (D-T) or deuterons and deuterons (D-D), together with neutralizing electrons, to confine the motion of those particles under conditions which will cause their interaction by fusion according to the following equation:

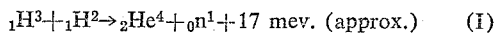

$$_1H^3 + {}_1H^2 \rightarrow {}_2He^4 + {}_0n^1 + 17 \text{ mev. (approx.)} \quad (I)$$

In the above reaction, the high-energy neutrons carry off about 14 mev. and the alpha particles or helium nuclei carry off the remaining 3 mev. of the approximate 17 mev. total.

Briefly, the invention comprehends the maintenance of a particle confining magnetic field, as exemplified by that within a solenoidal winding, usually energized from a steady D.C. source and also from an oscillating or time-varying A.C. source. The field intensity of such a solenoid is not uniform longitudinally but is greatly increased, by a factor of about three or more, at the ends thereof, so that the magnetic lines of force are highly compressed at those end points and are expanded or are less compressed throughout the intermediate portion of the elongated field. This results in the maintenance of opposed spatial magnetic gradients in the enclosed zone, directed toward the center thereof. Through one or both ends of the field and generally along the longitudinal or "Z" axis thereof, and into a confined, evacuated reaction zone, the reactive charged particles of hydrogen isotopes having a mass number greater than 1, viz. deuterons and tritons (D-T) or deuterons and deuterons (D-D), are introduced, together with neutralizing electrons, from suitable ion generators and accelerators or injectors known in this art.

Once within the reaction zone enclosed by the magnetic field, these particles, due to their charged condition and the influence of the field lines, assume generally asymmetric helical orbits which are confined within the field by forces which will be discussed in further detail below, and thereby traverse at high velocities exceedingly long paths until they interact by the mechanism of nuclear fusion to produce an intense flux of high energy neutrons and helium nuclei, as shown in the reaction mentioned above. The motion of each particle may be considered to have a Z component of travel and a transverse or $(r, \theta)$-component. So long as the $(r, \theta)$-component does not fall below a certain value (relative to the Z-component) the particle will be retained in its orbit relatively close to the center of the field, and, in addition, will be unable to escape from either end through the opposed magnetic field gradients. Certain of the forces acting upon the particles, specifically collisions with other particles, tend to randomize or disturb their helical motion, and a primary objective of this invention is to maintain, and to restore, as necessary, the rotational energy of the particles either at the expense of their translational energy or in addition to it, so that they will be confined for enough time to have completed a nuclear fusion reaction with another or a different particle.

In a steady elongated or solenoidal magnetic field with opposed spatial magnetic gradients at the ends thereof, the imposition of a time-varying, oscillating or pulsating magnetic field component $\beta$ will produce a condition that will have a confining effect upon charged particles having a generally helical motion and that are traversing or are enclosed within that field. This is due to what we prefer to designate a family of curved regions or "stable" and "unstable" bands, which are both radially and longitudinally symmetrically spaced about the center of the zone, and whose spacing, density, and thickness are dependent upon the length of the magnetic field, its radius and intensity, and the frequency and amplitude of the periodic magnetic field changes. In a "stable" band the total, time-averaged energy of the particle will remain constant during the traversal of that band, and the only net energy transfer that will occur will be between the rotational energy ($E_r$) and the translational energy ($E_z$) which will take place due to the interaction of the particle motion and change with the steady magnetic field gradient.

In an "unstable" band, the interaction of the imposed periodic or time-varying, oscillating, or pulsating magnetic field with the particle will increase its total time-averaged energy and will impart an increase of rotational energy ($E_r$) during the traversal of the particle through that band. Such increase will be over and above any normal change in energy of the particle due to the steady magnetic field component. This particle will thereby be rendered more susceptible to the confining effects of any magnetic gradient that may be present as, for example, at the ends of the magnetically confining field. The radial confining effect occurs through normal action of magnetic field applying a force perpendicular to both the direction of the magnetic field line and direction of the particle velocity. Thus the moving particles tend to gravitate to the central stable portion of the magnetically confined reaction zone and tend to be retained therein by the energy-imparting and polarizing action of the unstable bands upon those particles which have lost rotational energy ($E_r$) by scattering, collisions, and other effects.

It is the object of this invention to provide a method of confining the paths of rapidly moving charged reactive particles in a nuclear fusion reaction zone.

Another object is to provide a method of creating an intense flux of high-energy neutrons.

Another object is to provide an intense flux of high-energy neutrons from a nuclear fusion reaction zone and to direct them into a moderated blanket zone of source-fissionable materials to produce heat therein.

Another object is to provide a method of producing high energy neutrons from a driven thermonuclear or fusion reaction between hydrogen isotopes by confining them within a periodic or time-varying, oscillating, or pulsating magnetic field, as distinguished from those produced by a spontaneous or controlled fusion reaction.

Another object is to provide a method of producing interaction of deuterons with tritons (D-T) or deuterons with deuterons (D-D), in which the neutrons emanating from said zone cause nuclear transformations in a moderated blanket zone of source-fissionable material, the intermediate thermally-fissionable material produced being consumed in situ in said blanket.

Another object is to provide a method of producing heat from a D-T nuclear fusion reaction zone which will be at least partially independent of one of its reactive materials, for example, tritium, by forming such material from a readily available substance, for example, lithium 6, during normal operation of the method.

Another object is to provide an improved method of producing tritium.

Another object is to provide a fusion reaction or charged nuclear particle confining method utilizing periodic or time-varying, oscillating or pulsating magnetic fields that will be operable at lower than the cyclotron frequency of the particles involved.

Another object is to provide an improved method of producing particle-confining fields that will be useful throughout a wide range of frequencies, by optional utilization of one or more of a multiplicity of frequency bands.

Another object is to provide a method of confining a nuclear fusion reaction which does not require the use of high voltage gradients in said reaction zone.

These and other objects and advantages will be further apparent from the following description and from the attached drawings, which illustrate a preferred embodiment of the invention and certain of the reactions that are considered to take place therein.

Figure 1:
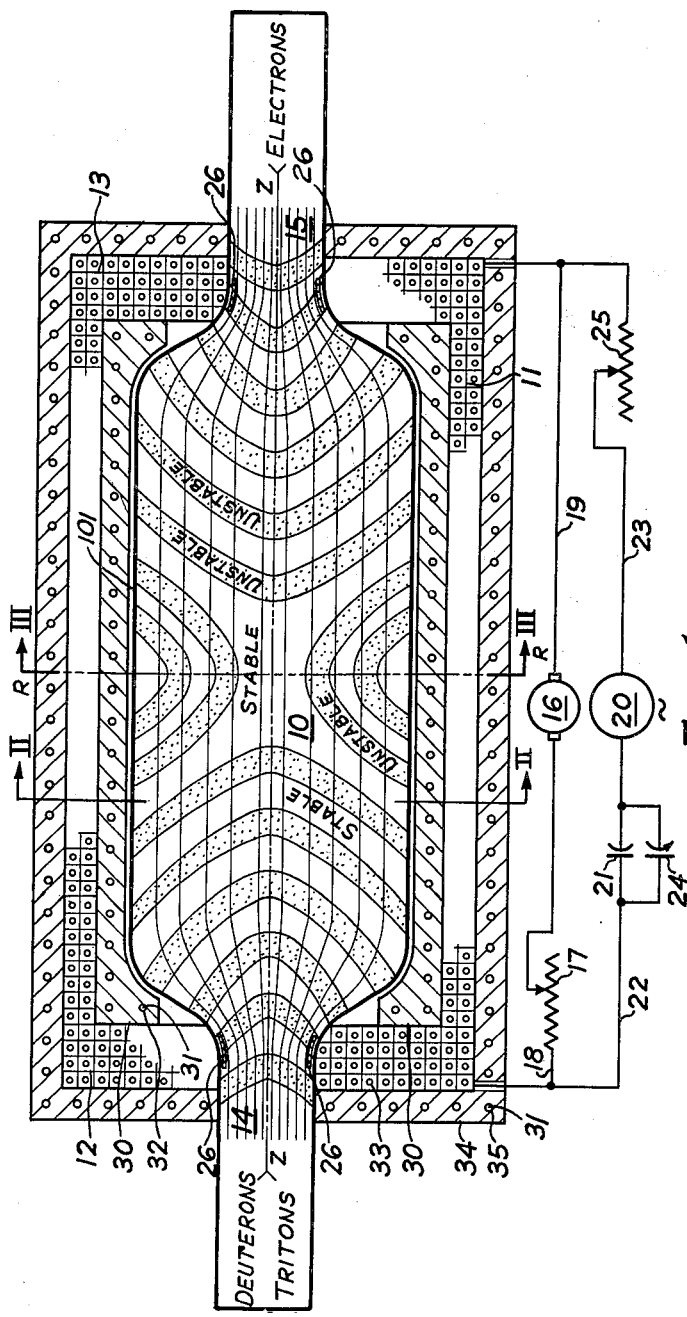
FIGURE 1 is a diagrammatic longitudinal sectional view of a fusion reaction zone embodying this invention, surrounded by a blanket of neutron-capturing and high-energy fission mediums, with a schematic representation of magnetic flux distribution and stable and unstable zones for particle confinement within the reaction zone.

Referring to FIGURE 1 of the drawings, there is illustrated generally an evacuated reaction zone 10, formed within a container 101 of non-magnetic material. Evacuation to the very low pressures not uncommon in various known nuclear particle reactions is carried out by suitable known means not shown. Zone 10 of this example is preferably elongated and cylindrical and is surrounded by a solenoidal winding 11, the end portions 12 and 13 of which are shown as consisting of a greater number of turns than the central portion, to give a higher magnetic flux density at the reduced diameter ends 14 and 15 of the zone. Alternatively, the end portions 12 and 13 may be separately energized to carry higher exciting currents than the central portion. In any case, means are provided to produce opposed spatial magnetic gradients at the ends of zone 10. Such a configuration could be designated a longitudinally asymmetric or terminally concentrated elongated magnetic field.

In this example, reactive charged particles of deuterons and tritons are illustrated as being introduced together into the restricted end portion 14 of zone 10 from any suitable type of ion injector or accelerator (not shown). Desirably, these positively charged particles are injected axially or at a slight angle into the zone with a predetermined energy content of about 10 to 50 kev. The space charges acting between the particles as they enter the zone and the forces between their charges and the diverging magnetic field lines will impart rotational energy to the motion of the particles so that they will initially have a small-radius helical motion about the axis of their initial longitudinal progress.

Electrons from a suitable injector are introduced into the opposite end of the zone 10, through the restricted end portion 15, and neutralize in part the space charges between the reactive particles just discussed.

Figure 4:
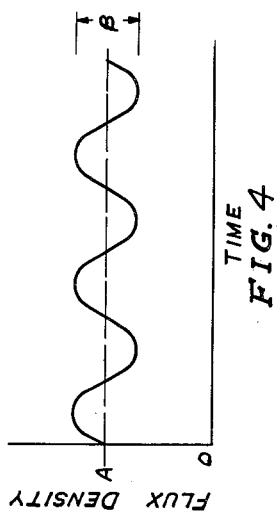
FIGURE 4 is a graphic representation of a general relation of a steady to an oscillating magnetic flux density for the magnetic particle-confining field.
Figure 3:
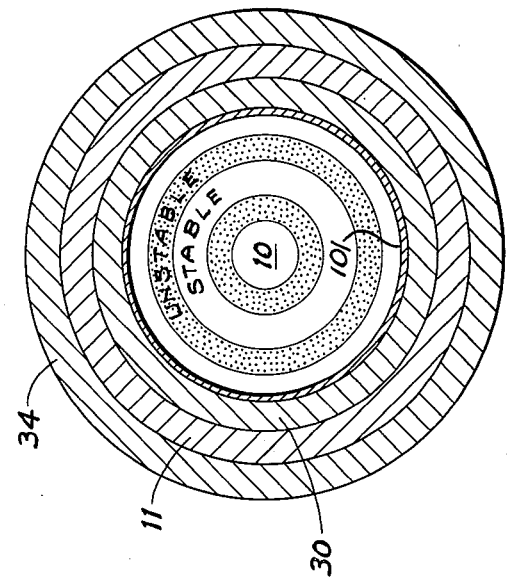
FIGURE 3 is a diagrammatic cross-sectional view on line III—III of FIGURE 1, substantially at the center thereof, showing the concentric and consecutive nature of the stable and unstable zones or bands at that point.
Figure 2:
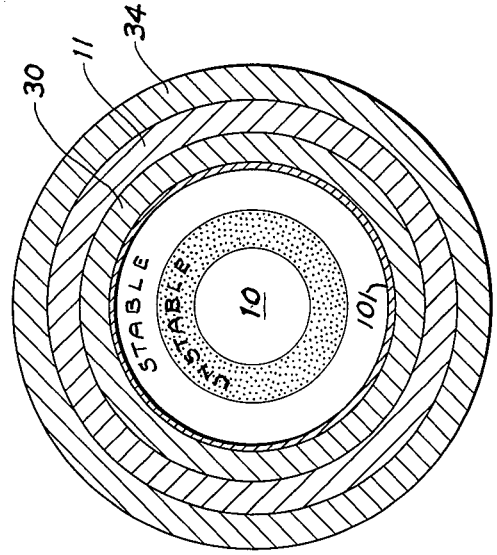
FIGURE 2 is a diagrammatic cross-sectional view on line II—II of FIGURE 1 near one end thereof, showing the general symmetrical nature of consecutive stable and unstable zones or bands in the reaction zone.

To obtain the desired driving frequency F on zone 10 and thereby set up the stable and unstable bands discussed above and indicated, respectively, by the labelled unshaded and shaded (dotted) areas within zone 10, the solenoidal winding is energized from a direct current source generally designated 16 through current control means 17 and conductors 18 and 19 to produce a predetermined steady magnetic flux component A represented by that value of FIGURE 4. The periodic time-varying, oscillating, or pulsating magnetic flux component (of amplitude $\beta$ times the magnitude of the steady flux) which is at the frequency F is superimposed on the steady flux, in this example, by also energizing winding 11 from an oscillator 20 connected through a suitable capacitor 21 and conductors 22 and 23 to form a resonant or tank circuit with winding 11 constituting the inductance thereof. Frequency adjustment is obtained by means such as a variable capacitor 24 in parallel with fixed capacitor 21. Amplitude of the high frequency current supplied to winding 11 is controlled by means such as resistor 25. The steady current generator is desirably decoupled from the time-varying current generator by suitable filters.

Referring now to the nature of the complex magnetic forces that confine these particles in zone 10 and prevent their escape both radially and from the ends of the zone, the long-time containment of the particles is effected by the specific and novel relationships between the magnitude and frequency of the oscillating components relative to the steady field component, the spatial gradients at the ends of the field, the ratio of the radius to the length of the magnetically confined nuclear fusion reaction zone, and other factors which will be apparent from this disclosure to one skilled in this art.

In the first place, for adequate confinement of the charged reactive particles, for example deuterons-tritons or deuterons-deuterons, it has been determined that the vacuum electromagnetic energy density in the reaction zone must equal or exceed twice the particle energy density per unit volume. In other words for a steady magnetic field:

$$\frac{H^2}{8\pi} \geq nkT \qquad (II)$$

where
$H$=value of the magnetic field
$n$=density of charged particles per unit volume
$k$=Boltzmann constant
$T$=temperature (° K.)

For an oscillating magnetic field:

$$\frac{\langle H^2+E^2 \rangle}{8\pi} \geq 2nkT \qquad (III)$$

($\langle \ \rangle$ indicates a time average over the period of the oscillating field), where $E$=electric field induced by the oscillation of the magnetic field.

In the foregoing and subsequent equations values are expressed in consistent Gaussian units.

In our previously filed applications, Serial Nos. 422,846 and 426,353, referred to above, it has been considered that any oscillatory particle-containing fields, in those cases externally applied electrical fields, should necessarily be at or near the so-called "cyclotron" frequencies which is resonant with the specific particles involved. In the present invention, however, particle containment can be effected with much lower than the cyclotron frequencies, the frequencies being limited primarily by apparatus criteria and economic considerations of power generation and application, rather than by the so-called "cyclotron" frequency and application.

For containment by what may generally be termed periodically time-varying or oscillatory magnetic fields the locations of the unstable frequency bands can be determined if the magnitude of the magnetic field as a function of position and the driving frequency are known. In particular, for a field-driving function of the type $$1 + \beta \sin(2\pi F t + \phi) \quad (IV)$$

where
$\beta$ is fraction of the field amplitude which oscillates
$F$ is driving frequency
$t$ is time
$\phi$ is an arbitrary phase angle
the relation $$\frac{|H|}{F}\left(1 + \frac{\beta^2}{2}\right)^{1/2} = \frac{2\pi m c}{e} n \quad (V)$$

where
$H$ is the magnitude of the magnetic field
$m$ is the particle mass
$e$ is the particle charge
$c$ is the velocity of light in vacuum
$n$ is any natural integer $(1, 2, 3, \ldots)$ may be used to either determine the position of the unstable bands if the frequency is known or to set the unstable bands in a given position for a given magnetic field distribution.

The other driving functions are of interest. The first of these is a square wave, namely $$1 + \beta S_0(2\pi F t) \quad (VI)$$

where $S_0(2\pi F t)$ is a square wave of amplitude one and frequency $F$ of arbitrary phase.

In this case the unstable bands will occur in regions of the field where the relation $$\frac{|H|}{F}\left(1 + \frac{\beta^2}{2}\right)^{1/2} = \frac{2\pi m c}{e} n \quad (VII)$$

is satisfied.

The second alternate driving function of interest is that of the fully oscillating field, namely $$\sin(2\pi F t + \phi) \quad (VIII)$$

where $\phi$ is an arbitrary phase angle.

In this, the unstable bands will occur in regions where the relation $$\frac{|H|}{F} = \frac{4\sqrt{2}\pi m c}{e} n \quad (IX)$$

is satisfied.

In all cases the unstable bands are of varying width around the regions determined by the above relation. They are always separated from one another by stable regions.

Directionally, for a given field configuration, the effect of $F$ and $\beta$ are as follows:

$F$, the driving frequency, determines the number of bands within the containment volume. For a given magnetic field configuration, the smaller the driving frequency, the larger the number of bands within the containment region.

$\beta$, the fractional driving field amplitude, determines the thickness of the bands. Directionally, but not everywhere, the smaller $\beta$ is, for a given magnetic field configuration, the higher will be the ratio of stable band area to unstable band area.

There are three general conditions for the amplitude $\beta$ of the periodically varying component of the magnetic field. The first involves a value of $\beta$ of less than 50% of the steady field amplitude. The second involves a value of $\beta$ greater than 50% of the steady field amplitude, and the third applies when there is no steady field component, but only a fully oscillating magnetic field.

For the first two cases, unstable and stable bands will be formed, leading to particle confinement, provided the driving frequency $F$ meets the following condition:

$$F < \frac{1}{4} \frac{eH_{max}}{m_{max}c}\left(1 + \frac{\beta^2}{2}\right)^{1/2} \quad (X)$$

where $F$ is the driving frequency is the fractional driving amplitude
$H_{max}$ is the largest magnetic field in the containment region
$m_{max}$ is the mass of the heaviest particle to be contained
$e$ is the particle charge
$c$ is the velocity of light in vacuum For the third condition, where the magnetic field is purely oscillating, $$F < \frac{1}{8\sqrt{2}} \frac{eH_{max}}{m_{max}c} \quad (XI)$$

is the corresponding maximum frequency condition.

We prefer that these bounds should not be exceeded, in order to obtain adequate containment.

For a given volume of reactive particles to be magnetically confined the power requirements are proportional to $\beta\sqrt{F}$, so that $\beta$ and $F$ should be as small as possible, consistent with particle-holding considerations. Also, directionally, as $F$ decreases, the density of unstable bands increases, while their width decreases. For the first and third conditions identified above, the limiting factors for $F$ are the length $L$ of the particle-confining field and the particle velocity $V$, so that, approximately, $$F > \frac{V}{2\pi L} \quad (XII)$$

This condition is necessary to prevent particle leakage before the forces induced by the time-varying field have had a sufficiently long period to act upon the particle to be contained. In particular, it states that at least one cycle of the oscillating field component should occur during one axial traverse of the particle. For the second case, the electric field which accompanies the periodically varying magnetic field will be phased in such a manner that only weak confining forces will be exerted on the particles during that ¼ of the cycle when the magnetic field is closest to zero. Consequently, a reasonable condition is that the radius $R$ of the field should be chosen to be more than about 10 times the radial drift of a given particle during this portion of the cycle or, approximately, $$\frac{1}{8\pi F} < \frac{R}{10V} \quad (XIII)$$

which may be stated $$F > \frac{5V}{2\pi R} \quad (XIV)$$

Desirably, $R$ should be several cyclotron orbits in magnitude, preferably not less than about 10, so that $$R > 10 \frac{V}{w_{min}} = 10 \frac{mV}{eH_{central}} \quad (XV)$$

where:

$V$ is heaviest particle velocity
$w_{min}$ is heaviest particle angular cyclotron frequency The bounds on the driving frequencies may be summarized as follows:

(1) Driving functions of type one ($\beta < 0.5$)

$$\frac{V}{2\pi L} < F < \frac{1}{4} \frac{eH_{max}}{cm_{max}} \left(1 + \frac{\beta^2}{2}\right)^{1/2} \quad \text{(XVI)}$$

(2) Driving function of type two ($\beta > 0.5$)

$$\frac{5V}{2\pi R} < F < \frac{1}{4} \frac{eH_{max}}{cm_{max}} \left(1 + \frac{\beta^2}{2}\right)^{1/2} \quad \text{(XVII)}$$

(3) Driving functions of type three (fully oscillating field)

$$\frac{V}{2\pi L} < F < \frac{1}{8\sqrt{2}} \frac{eH_{max}}{cm_{max}} \quad \text{(XVIII)}$$

Thus, while the second and third cases are operable, the first condition, where $\beta$ is less than about 50% of the steady field amplitude requires the least power input to the time-varying portion of the magnetic particle-confining field. The lower limit for $\beta$ would be about 0.05%. The radius R and its desirable and operable limits are discussed above.

As a specific and illustrative, but not restrictive, example of a preferred operation of this invention, with a reaction zone of about one meter radius and 10 meters long, deuterons, tritons, and neutralizing electrons are introduced as illustrated in FIGURE 1, each at about 50 kev. energy. Deuterons and tritons are at a density within zone 10 of about $2 \times 10^{13}$ particles each per cubic centimeter, and electrons at about twice that value, or about $4 \times 10^{13}$ particles per cubic centimeter. The steady magnetic flux density may be about 15,000 gauss in the central portions 11 of the field, increasing sharply to about 60,000 gauss at the ends 12 and 13. Under the circumstances outlined, the resonant or cyclotron frequency of the deuterons and tritons are in the neighborhood of 11.4 megacycles per second at the center of the reaction zone 10. The fraction $\beta$ or oscillating component of the magnetic field may be about 10% of the steady or A component, and desirably at a frequency of about 50 kilocycles per second. A total high-energy neutron yield from the reaction zone 10 of about 3 to 4 mols (1 mol = $6.02 \times 10^{23}$) per 24-hour day may be expected.

Under certain conditions and primarily to prevent loss of low-angle particles near the ends of zone 10, and to aid initial injection of reactive particles, electrostatically charged plates 26 may be placed in the reduced diameter inlets 14 and 15 of that zone. These may be excited at the proper phase relation to the oscillating magnetic field of winding 11 at frequencies approximating the cyclotron frequencies of the particles.

Referring again to FIGURE 1, there is shown a blanket zone 30 surrounding the nuclear fusion reaction zone 10, the blanket material being a source-fissionable material, for example depleted uranium, with which is incorporated a moderator such as beryllium oxide. These may be in a mechanical mixture, or fabricated into plates, pellets, slugs or blocks, and arranged or spaced in a suitable geometrical pattern, to meet the several design conditions, including ratio of moderator to source-fissionable materials, which will be understood by one skilled in this art. To provide for corrosion protection as well as for long-time containment of fission product, the source-fissionable material should preferably be canned or jacketed with known materials for this purpose. Lithium 6 is desirably incorporated in the blanket in natural lithium, and upon conversion to tritium serves to replenish the tritium consumed in the neutron flux-producing fusion reaction on zone 10. To facilitate removal of the lithium component for recovery of its tritium content, it should similarly be sealed and arranged in suitable positions for periodic withdrawal from the blanket zone 30 for processing.

Heat is removed from blanket 30 by the circulation of a suitable fluid 31, such as liquid metal; for example, bismuth or a eutectic such as Na—K, liquids such as light or heavy water which may also act as a moderator, or gases such as helium which are circulated through conduits or passages 32. Selection of these heat-transfer materials is based upon well understood nuclear, chemical and physical properties and forms no part of this invention.

The arrangement of FIGURE 1 illustrates the blanket zone 30 as substantially surrounding the major portion of fusion reaction zone 10 and positioned inside the winding 11 that is used in this example to produce the magnetic field in that zone. Alternatively, the windings 11 and blanket zone 30 could be reversed, sectionalized, or otherwise modified for convenience in fabrication or to improve the magnetic field and neutron flux relationships. Desirably the windings 11, 12 and 13 are cooled as by fluid-conveying conduits or passages 33 and are surrounded by a shield 34, similarly provided with cooling fluid-conveying conduits or passages 35. Shield 34 may contain neutron reflecting materials, such as beryllium, or beryllium oxide, and may also act as a biological or personnel-protecting unit, in which case it may contain ferritic- or barytes-concrete. The geometry of the blanket 30 and reflector or shield 34 is desirably such that the source-fissionable material and any intermediate products therefrom may initially be positioned to favor uniform reactivity and high burn-up with minimized handling or processing of blanket elements during the entire useful life of the installation.

Figure 5:
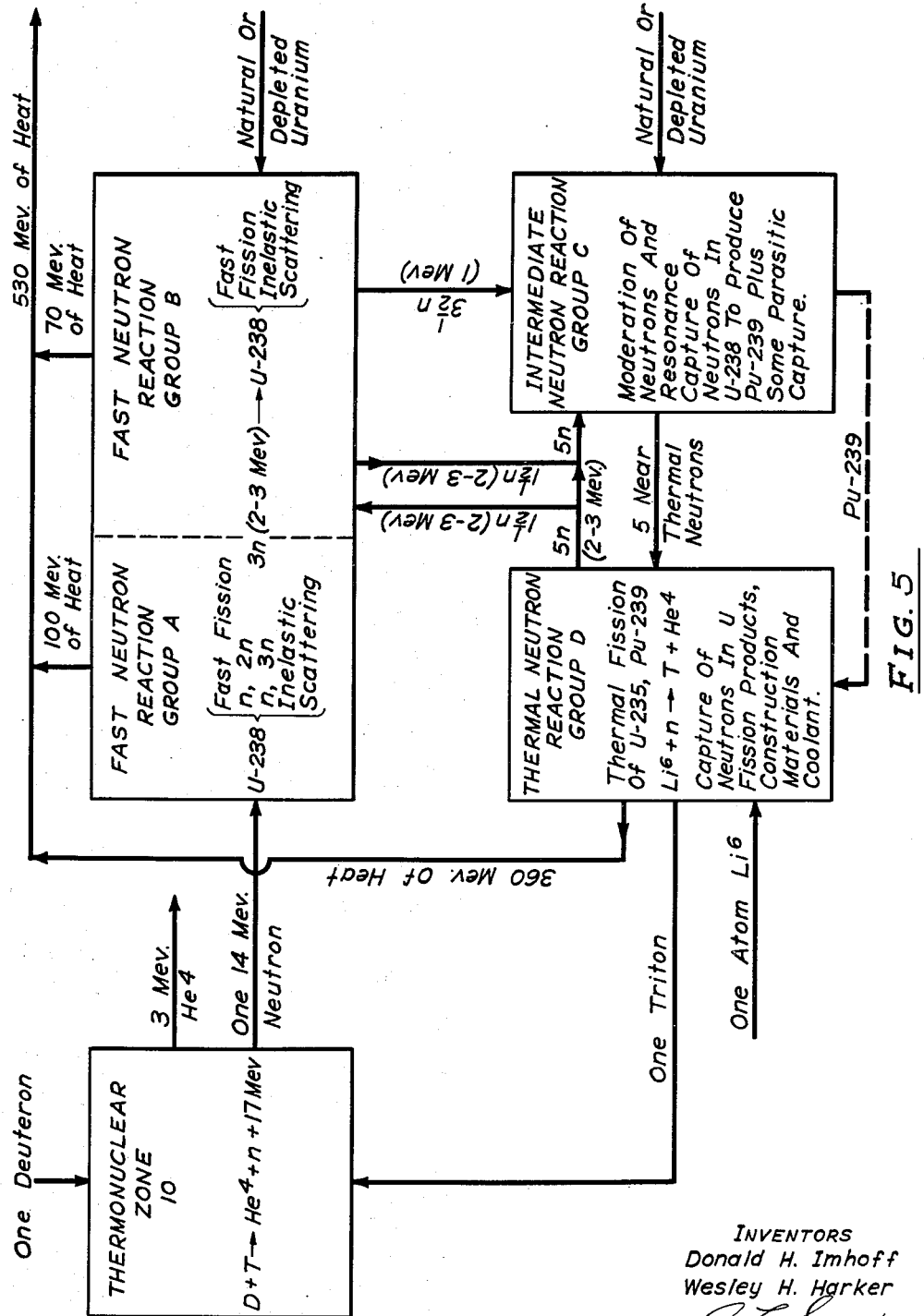
FIGURE 5 is a representative neutron and heat balance diagram that is illustrative of certain intermediate process operations and nuclear events in the blanket.

A more detailed description of the nuclear reactions effected pursuant to this invention and initiated by the action of the high-energy neutrons on the source-fissionable materials in the moderated blanket zone 30 will be found in the following paragraphs and FIGURE 5, which is a schematic illustrative diagram showing the principal reactions and approximate neutron and heat energy balance for a typical example of this invention.

The various nuclear reactions occurring in the blanket are broken into four groups in accordance with the average energy levels of the neutrons entering into the reactions. The neutron and heat balance is based on quantities derivable from a single reaction occurring in the thermonuclear zone between a deuteron and triton producing a 14 mev. neutron and a 2 mev. helium nucleus. The particular scheme presented is one in which optimization is approximated for maximum heat generation and for producing only sufficient tritium from the blanket to replace that consumed in the thermonuclear reaction. The following principal reactions are effected in the blanket:

The 14 mev. neutron impinging upon the blanket undergoes the nuclear reactions indicated in the diagram as Group A. These fast neutron nuclear reactions are primarily with uranium 238 and produce (n, 2n), (n, 3n) neutron multiplication, inelastic scattering, and heat generation by fast fissions. The net result of these competitive reactions is a neutron multiplication in which approximately three neutrons are produced for every one 14 mev. neutron. These three neutrons have an average energy of approximately 0.5 to 3 mev. These neutrons then are competitively distributed between the nuclear reactions indicated in the block diagram by Group B and Group C. Occurring in Group B are essentially more fast neutron reactions and inelastic scattering processes which degrade the neutron energy below the fission threshold of about 1 mev.

These degraded-energy neutrons, plus that fraction of neutrons from reaction Group A which did not enter into reaction Group B, are now subject to moderation and the reactions in Group C. The moderation process is one in which successive elastic collisions are made with a moderating material, such a moderator being a material of low atomic number and chosen from the group consisting of beryllium, beryllium oxide, graphite, heavy water, and the like. The result of these successive collisions with the moderating material is to continually decrease the neutrons' energy from approximately 1 mev. down through the resonance capture regions for source-fissionable material to thermal energies (.025 electron volt). When these neutrons are passing through or reach the resonance capture region, some are captured in uranium 238 to produce plutonium 239. The neutrons resulting from reaction Group C are of approximate thermal energy and enter into the reactions indicated in the diagram as reaction Group D. In reaction Group D, the following competitive reactions occur:

(1) A thermal neutron is captured in lithium 6 to produce a tritium atom and helium 4. This tritium as illustrated is being recycled to the thermonuclear zone.

(2) Consumption by thermal fission of uranium 235 which is present when depleted or natural uranium is used in the blanket.

(3) Consumption by thermal fission of plutonium produced in reaction Group C.

(4) Capture of neutrons in uranium fission products, uranium, construction materials and coolants.

The neutrons produced by the thermal fission of uranium 235 and plutonium 239 are, of course, of fission energy (approximately 2–3 mev.) and themselves proceed through reaction Groups B, C, and D. For the particular example indicated in FIGURE 5, the total amount of heat liberated is approximately 530 mev. per incident 14 mev. neutron from the fusion reaction zone and is produced by the respective neutron reactions as indicated in the drawing.

From the foregoing description, it will be apparent that new and useful methods have been described which will produce an intense neutron flux, desirably in the range of about 3 to 14 mev. and which may be introduced to react in a suitably shielded and moderated blanket zone of source-fissionable materials to produce heat. If desired, it is also contemplated to include lithium in the blanket zone and thereby produce tritium, either as a replacement for that consumed in a D-T fusion zone for neutron production, or as a final end product.

Although a simple example of an elongated field is illustrated and described above, in the form of a straight solenoid, it is apparent from this specification that other mathematically comparable configurations could be utilized, such as a regular toroid, or a toroid twisted into a figure 8, or the like, so long as the periodically varying magnetic field components are applied, either with or without the presence of magnetic field spatial gradients, to create the stable and unstable bands that characterize this invention, and are effective to add rotational energy to the motion of the reactive particles so that their containment time is adequate to effect a fusion reaction. Accordingly, the term elongated as used in the appended claims is to be understood as not limited to a straight line, but includes curved configurations of the types named.

It will be appreciated that numerous changes and modifications could be made from the examples given above without departing from the essential features of this invention, and all such modifications and changes that fall within the scope of the appended claims are intended to be embraced thereby.

We claim:

1. A method of controlling the production of high-energy neutrons by introducing fusion-reactive charged particles of hydrogen isotopes having a mass number greater than 1, together with neutralizing electrons, into an evacuated reaction zone within an elongated magnetic field having at least one magnetic gradient and varying the amplitude of said field and said gradient at an oscillatory periodic frequency to confine said particles within said zone.

2. A method of confining a neutron-producing reaction by introducing fusion-reactive charged particles of hydrogen isotopes having a mass number greater than 1, together with neutralizing electrons into an evacuated zone within an elongated magnetic field having opposed spatial magnetic gradients and varying the amplitude of said field and said gradients at an oscillatory periodic frequency.

3. A method of confining a neutron-producing reaction by introducing fusion reactive charged particles of hydrogen isotopes having a mass number greater than 1, together with neutralizing electrons, into an evacuated zone within an elongated magnetic field having opposed spatial gradients and varying the amplitude of said field at an oscillatory periodic frequency so that $\beta < .5A$ where
$\beta$ is the fraction of the total magnetic field which is time-varying,
and A is the amplitude of the steady magnetic field, and at a frequency less than the cyclotron frequency of said particles.

4. A method of confining a neutron-producing reaction by introducing fusion reactive charged particles of hydrogen isotopes having a mass number greater than 1, together with neutralizing electrons, into an evacuated zone within an elongated magnetic field having opposed spatial magnetic gradients and varying the amplitude of said field and said gradients at an oscillatory periodic frequency so that the frequency F of said periodically varied magnetic field meets the condition:

$$F < \frac{1}{4} \frac{eH_{max}}{m_{max}c} \left(1 + \frac{\beta^2}{2}\right)^{1/2} \quad (X)$$

where
$e$ is the charge of the particle,
$H_{max}$ is the maximum axial field,
$m_{max}$ is mass of the heaviest particle to be retained,
$c$ is velocity of light in vacuum,
and $\beta$ is the fraction of the total magnetic field amplitude which is time-varying.

5. A method of confining a neutron-producing reaction by introducing fusion reactive charged particles of hydrogen isotopes having a mass number greater than 1, together with neutralizing electrons, into an evacuated zone within an elongated magnetic field having opposed spatial magnetic gradients and varying the amplitude of said field and said gradients at an oscillatory periodic frequency so that the frequency F of said periodically varied magnetic field meets the condition:

$$F < \frac{1}{8\sqrt{2}} \frac{eH_{max}}{m_{max}c} \quad (XI)$$

where $e$ is the charge of the particle,
$H_{max}$ is the maximum axial field,
$m_{max}$ is mass of the heaviest particle to be retained,
and $c$ is velocity of light in vacuum.

6. A method of confining a neutron-producing reaction by introducing fusion reactive charged particles of hydrogen isotopes having a mass number greater than 1, together with neutralizing electrons, into an evacuated zone within an elongated magnetic field having opposed spatial magnetic gradients and varying the amplitude of said field and said gradients at an oscillatory periodic frequency so that the magnitude of said field at a given time and position in the field is periodically varied in time according to a function of the type:

$$f(t) = P(2\pi F t + \phi) \quad (VIII)$$

where
$f(t)$ is the normalized time variation of the field,
P is a periodic function of time such that
$f(t+T) = \pm f(t)$ for all values of $t$,
T being the constant period or $$\frac{1}{2\pi F}$$

F is the frequency in cycles per second,
$t$ is time,
and $\phi$ is an arbitrary phase angle.

7. A method of confining a neutron-producing reaction by introducing fusion reactive charged particles of hydrogen isotopes having a mass number greater than 1, together with neutralizing electrons, into an evacuated zone within an elongated magnetic field having opposed spatial magnetic gradients and varying the amplitude of said field and said gradients at an oscillatory periodic frequency so that the magnitude of said field at a given time and position in the field is periodically varied in time according to the function:

$$f(t) = 1 + \beta \sin(2\pi Ft + \phi) \quad \text{(IV)}$$

where
- $f(t)$ is the normalized time variation of the field,
- $\beta$ is the fraction of the total field amplitude which is time-varying,
- F is the frequency in cycles per second,
- $t$ is time,
- and $\phi$ is an arbitrary phase angle.

8. A method of confining a neutron-producing reaction by introducing fusion reactive charged particles of hydrogen isotopes having a mass number greater than 1, together with neutralizing electrons, into an evacuated zone within an elongated magnetic field having opposed spatial magnetic gradients and varying the amplitude of said field and said gradients at an oscillatory periodic frequency so that the magnitude of said field at a given time and position in the field is periodically varied in time according to the function:

$$f(t) = \sin(2\pi Ft + \phi) \quad \text{(VIII)}$$

where
- $f(t)$ is the normalized time variation of the field,
- F is the frequency in cycles per second,
- $t$ is time,
- and $\phi$ is an arbitrary phase angle.

9. A method of confining a neutron-producing reaction by introducing fusion reactive charged particles of hydrogen isotopes having a mass number greater than 1, together with neutralizing electrons, into an evacuated zone within an elongated magnetic field having opposed spatial magnetic gradients and varying the amplitude of said field and said gradients at an oscillatory periodic frequency so that the magnitude of said field at a given time and position in the field is periodically varied in time according to the function:

$$f(t) = A + \beta S_0(2\pi Ft + \phi) \quad \text{(VI)}$$

where
- $f(t)$ is the normalized time variation of the field,
- A is the normalized steady magnetic field amplitude having a value of either zero or 1,
- $S_0$ is the square wave function of F, $\phi$, amplitude 1,
- $\beta$ is the fraction of the total field amplitude which is time varying,
- F is the frequency in cycles per second,
- $t$ is time,
- and $\phi$ is an arbitrary phase angle.

10. A method of confining a neutron-producing reaction by introducing fusion reactive charged particles of hydrogen isotopes having a mass number greater than 1, together with neutralizing electrons, into an evacuated zone within an elongated magnetic field having opposed spatial magnetic gradients and varying the amplitude of said field and said gradients at an oscillatory periodic frequency so that length L of said field is not less than:

$$L > \frac{V}{2\pi F} \quad \text{(XII)}$$

where
- L is the distance between maximum field values,
- V is particle velocity,
- and F is driving frequency.

11. A method of confining a neutron-producing reaction by introducing fusion reactive charged particles of hydrogen isotopes having a mass number greater than 1, together with neutralizing electrons, into an evacuated zone within an elongated magnetic field having opposed spatial magnetic gradients and varying the amplitude of said field and said gradients at an oscillatory periodic frequency so that the radius R of said field is not less than that given in the relation:

$$R > \frac{10mcV}{eH_{\text{central}}} \quad \text{(XV)}$$

where
- R is radius of the containment volume,
- $m$ is mass of heaviest particle to be retained,
- $c$ is velocity of light in vacuum,
- V is maximum particle velocity,
- $e$ is particle charge,
- and $H_{\text{central}}$ is the magnitude of the magnetic field at the center of the containment volume.

12. A method of producing a controlled flux of fast neutrons comprising the steps of injecting deuterons and tritons as reactive particles, together with neutralizing electrons, into an evacuated reaction zone within an elongated magnetic field having opposed spatial magnetic gradients and varying the magnitude of said field at an oscillatory periodic frequency less than the cyclotron frequency of said particles to confine them within said zone.

13. A method of producing a controlled flux of fast neutrons comprising the steps of injecting deuterons as reactive particles, together with neutralizing electrons, into an evacuated reaction zone within an elongated magnetic field having opposed spatial magnetic gradients and varying the magnitude of said field at an oscillatory periodic frequency less than the cyclotron frequency of said particles to confine them within a predetermined portion of said zone.

14. A method of generating heat which comprises the steps of introducing reactive charged particles of hydrogen isotopes of mass greater than 1, together with neutralizing electrons, into an evacuated confined zone within an elongated magnetic field having opposed spatial magnetic gradients at the ends thereof, varying said field at a periodic oscillatory frequency to confine said particles within said zone with the release of a flux of high-energy neutrons, introducing said neutrons into a blanket zone containing a moderator capable of reducing said neutrons to near-thermal energies, and source-fissionable material chosen from the group consisting of natural uranium, depleted uranium, uranium 238 and thorium 232 to produce heat therein and recovering said heat.

15. A method according to claim 14 in which said hydrogen isotopes are deuterium and tritium.

16. A method according to claim 14 in which lithium is included in said blanket zone to be converted to tritium, and tritium is recovered from said zone.

17. A method according to claim 14 in which said hydrogen isotopes are deuterium and tritium, and lithium is included in said blanket zone, and tritium produced from said lithium is introduced into said zone.

18. A method according to claim 14 in which thermally fissionable material present and produced in said blanket zone is consumed in situ therein.

19. A method of producing a controlled flux of high energy neutrons comprising the steps of introducing charged particles of hydrogen isotopes having a mass number greater than 1, together with neutralizing electrons, into an evacuated reaction zone having at least one magnetic gradient and increasing the total time-averaged and rotational energy of said charged particles by varying the amplitude of said field and said gradient at an oscillatory periodic frequency to confine said particles within said zone.

20. A method of producing a controlled flux of high energy neutrons comprising the steps of introducing charged particles of hydrogen isotopes having a mass number greater than 1, together with neutralizing electrons, into an evacuated reaction zone within an elongated magnetic field having opposed spatial magnetic gradients and increasing the total time-averaged and rotational energy of said charged particles by varying the amplitude of said field and said gradients at an oscillatory periodic frequency.

21. A method of producing a controlled flux of high energy neutrons comprising the steps of injecting charged particles of hydrogen isotopes having a mass number greater than 1 and a kinetic energy of about 50 Kev., together with neutralizing electrons into an evacuated reaction zone within an elongated magnetic field having opposed spatial gradients and periodically varying the amplitude of said field and said gradients at an oscillatory periodic frequency.

22. A method according to claim 21, in which said amplitude is varied so that $\beta < .5A$.
where $\beta$ is the fraction of the total magnetic field which is time-varying, and A is the amplitude of the steady magnetic field,
and at a frequency less than the cyclotron frequency of said particles.

23. A method according to claim 21 in which said amplitude is varied so that $\beta > .5A$
where $\beta$ is the fraction of the total magnetic field which is time-varying, and A is the amplitude of the steady magnetic field, and at a frequency less than the cyclotron frequency of said particles.

References Cited in the file of this patent

FOREIGN PATENTS

| | | |
|---|---|---|
| 656,398 | Great Britain | Aug. 22, 1951 |
| 706,036 | Great Britain | Mar. 24, 1954 |

OTHER REFERENCES

Proceedings of the Royal Society of London, A204 (1950), pages 488–495.

Pocket Encyclopedia of Atomic Energy, by Frank Gaynor. Philosophical Library. New York, 1950, pages 74–76.

S. W. Cousins and A. A. Ware: Proc. Phys. Soc. (London), B64 (1951), pages 159–166.

Physical Review 88 (1952), pages 468–473.

Nuclear Radiation Physics, by R. E. Lapp and H. L. Andrews, 2nd Edition, 1954. Prentice-Hall, New York. Pages 303–307.

Nucleonics, November 1955, pp. 62–66 (Thirring).

Kurchatov: June 1956, Discovery, pp. 227–233.

Atom No. 25, November 1958 publ. by Monthly Information Bulletin of the United Kingdom Atomic Energy Authority. Pages 12, 13.

Sourcebook on Atomic Energy, by Samuel Glasstone, D. Van Nostrand Co., N.Y., pp. 236–244.

Nuclear Engineering, March 1958, pages 95–101.